United States Patent

[11] 3,631,953

| [72] | Inventors | Joseph B. Snoy;<br>Basil White, both of Rockford, Ill. |
|---|---|---|
| [21] | Appl. No. | 83,542 |
| [22] | Filed | Oct. 23, 1970 |
| [45] | Patented | Jan. 4, 1972 |
| [73] | Assignee | Twin Disc, Incorporated<br>Racine, Wis. |

[54] FRICTION PLATE CLUTCH HAVING MEANS TO DAMPEN PLATE FLUTTER
3 Claims, 7 Drawing Figs.

[52] U.S. Cl. ........................................... 192/70.17,
188/71.5, 188/73.5, 192/70.2, 192/106.1, 64/14, 64/23
[51] Int. Cl. ...................................................... F16d 13/68,
F16d 13/52, F16d 3/14

[50] Field of Search ............................................ 192/70.17, 70.2, 106.1; 64/14, 23; 188/71.5, 73.5, 218 A

[56] References Cited
UNITED STATES PATENTS

| 3,245,508 | 4/1966 | Livezey | 192/70.17 |
| 3,446,323 | 5/1969 | Hilpert | 192/70.11 |

*Primary Examiner*—Allan D. Herrmann
*Attorney*—James E. Nilles

ABSTRACT: A friction plate-type clutch having interleaved clutch plates that can be axially clamped up to cause clutch engagement, or alternatively can be released by causing their axial separation. Resilient means are provided between the radially inner set of clutch plates, which means act to cause the radially inner set of plates into a mode of flutter, which flutter can then be damped by split-type outer clutch plates.

INVENTORS:
JOSEPH B. SNOY
BASIL WHITE
BY: James E. Nilles
ATTORNEY

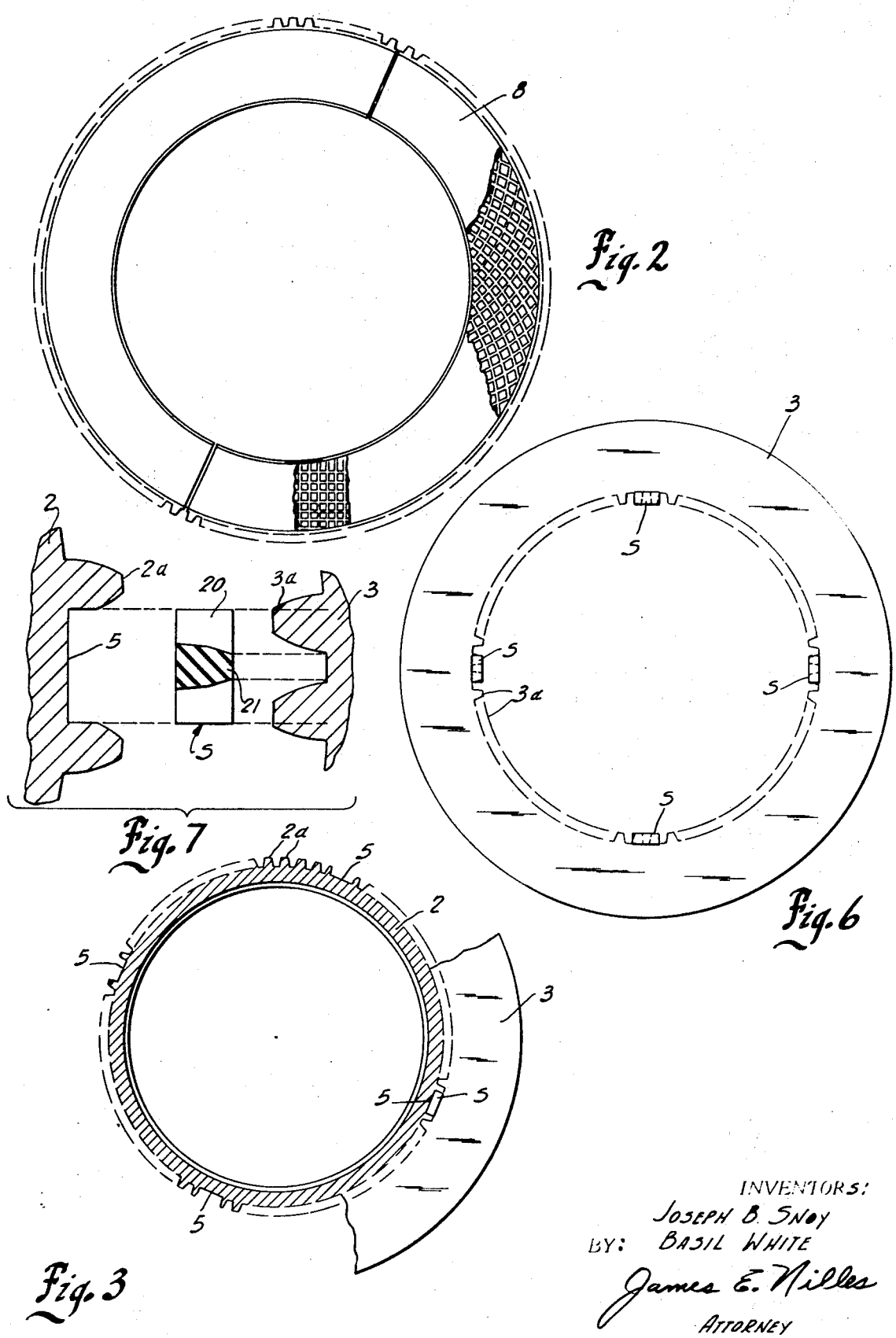

FRICTION PLATE CLUTCH HAVING MEANS TO DAMPEN PLATE FLUTTER

BACKGROUND OF THE INVENTION

The invention pertains to friction plate clutches having interleaved sets of plates, one set constituting an inner set fixed to one member of the clutch and the other set constituting an outer set of plates which are rotationally fixed to another member of the clutch. Under certain circumstances, these plates tend to flutter, wobble or have other gyroscopic instability, particularly when the clutch is running in the disengaged position. Such instability and flutter may suddenly cause a great increase in drag torque thus resulting in extreme heat and lock up of the clutch and in some instances total destruction thereof.

An example of prior art type devices which have attempted to solve this problem are shown in the following three patents which have been assigned to an assignee common with the present invention and in which R. C. Hilpert is the inventor; U.S. Pat. No. 3,446,323 issued May 27, 1969; U.S. Pat. No. 3,472,348 issued Oct. 14, 1969; and U.S. Pat. No. 3,482,668, issued Dec. 9, 1969. As shown particularly in the said U.S. Pat. No. 3,472,348, split outer plates are provided and radially shiftable rigid toothed means are mounted for abutment and spacing of the inner set of plates. One shortcoming of that prior art device however was the variable centrifugal loading and the fact that the precise spacing of the notches made it impractical for an assembly with a large number of clutch plates, because one notch spacing could be less than total running clearance of the assembly.

SUMMARY OF THE PRESENT INVENTION

The present invention provides a friction type clutch having inner and outer sets of plates which are interleaved and can be axially shiftable to cause clutch engagement and disengagement, which clutch includes flexible means inserted between the radial internal teeth of the inner set of plates so as to force the inner plates into a particular mode of flutter. The clutch also has the outer set of plates of the split type, which split plates can then damp out a mode of flutter that has been set up by the resilient means in the inner set of plates.

Stated otherwise, the present invention provides a friction plate-type clutch having inner and outer sets of interleaved plates, resilient end means for locking all of the inner plates together so that if one of the sets of inner plates commences to lean or wobble, all of the inner plates will lean or wobble in unison, and develop a particular mode of flutter. The outer plates of the clutch are split and then act, due to the drag created by centrifugal force to damp out this particular mode of flutter.

These and other objects and advantages of the present invention will appear hereinafter as this disclosure progresses, reference being had to the accompanying drawings.

BRIEF DESCRIPTION OF THE DRAWINGS

FIG. 2 is a transverse view of the outer plates shown in FIG. 1, certain parts broken away for clarity;

FIG. 3 is a transverse view of the inner hub shown in FIG. 1 and showing a portion of an inner plate with one of the resilient means of the present invention in place on the hub;

FIG. 6 is a transverse view of an inner plate with the resilient separators in place; and FIG. 7 is an enlarged fragmentary, exploded and sectional view of the hub separator and inner plate.

DESCRIPTION OF A PREFERRED EMBODIMENT

Figure 1:
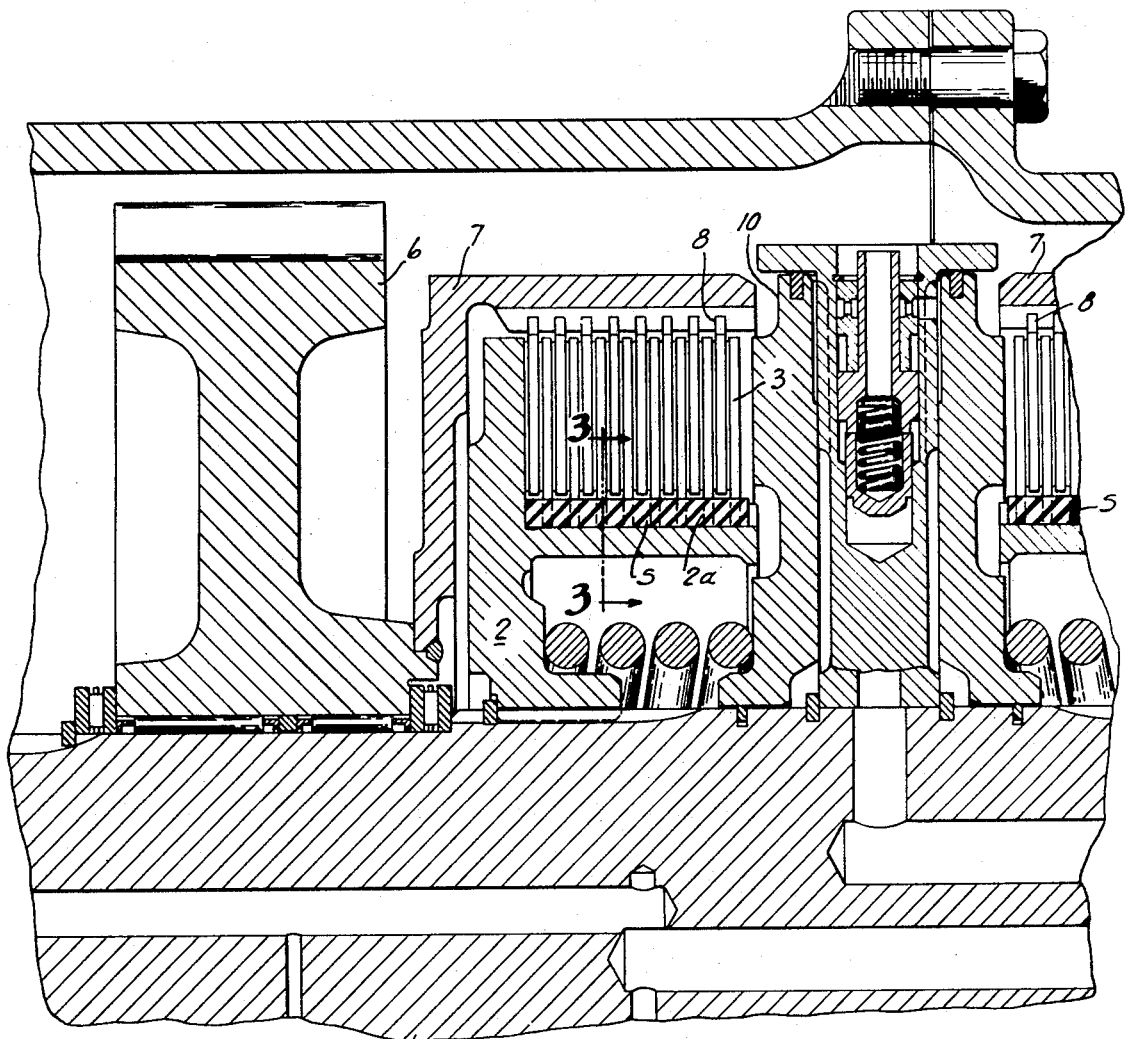
FIG. 1 is a fragmentary, longitudinal cross-sectional view through a friction plate-type clutch embodying the present invention.

As shown in FIG. 1, the clutch made in accordance with the present invention is of the general type as shown in my U.S. Pat. No. 3,243,026, issued Mar. 29, 1966 and includes a shaft 1 to which is fixed the hub 2 having axial splines 2a. An inner set of clutch plates 3 having internal teeth 3a are axially slideable on but rotationally fixed on the hub 2 in the known manner. It will be noted that the hub as shown in FIG. 3 has a plurality of sections 5 cut out from its periphery, four such sections being shown in FIG. 3. More specifically, sections 5 are formed by the removal of a spline 2a from along the hub.

The clutch also includes another member 6 in the form of a gear which is rotatably mounted on shaft 1 and to which gear a radially outer member of the clutch, in the form of clutch drum 7, is welded. The outer set of clutch plates 8 are axially splined to the internally splined portion of drum 7. Thus, the inner plates 3 and the outer plates 8 are interleaved and can be axially shifted and clamped together by the hydraulically actuated piston 10 in the known manner. This axial shifting is small, that is, about 5/1000 inch of movement per plate is all that is required to cause clutch engagement.

The outer plates are of the split type as shown in FIG. 2 and which are further described in the U.S. Pat. No. 3,482,668.

Figure 4:
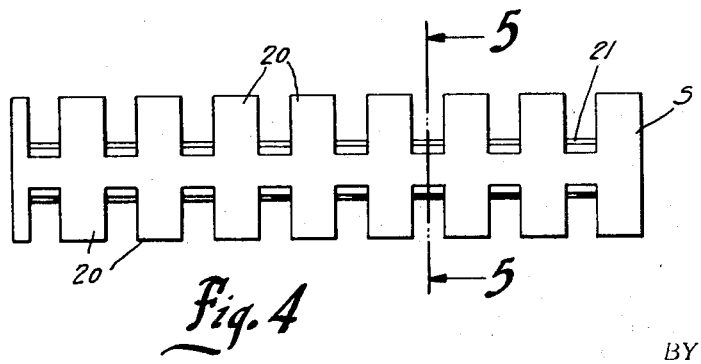
FIG. 4 is a longitudinal view of an enlarged scale and showing one of the resilient means for holding the inner plates apart.
Figure 5:
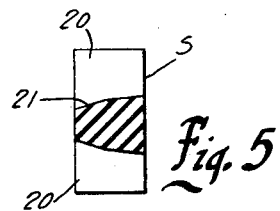
FIG. 5 is a sectional view of the resilient means shown in FIG. 4, the view being taken generally along the line 5–5 in FIG. 4.

In accordance with the present invention, a resilient separator S is shown clearly in FIGS. 4 and 5 and has a series of teeth 20 extending along each of its opposite sides and from its central portion 21. The separator S is adapted to set in the recess 5 of the hub and its teeth are engaged or are inserted between the adjacent teeth of the inner plates. This resilient separator can be of the type known as "Viton" made by duPont, but other types of resilient material may be used as long as they are resilient and also preferably capable of withstanding high temperatures.

The action of the resilient separator is to lock all of the inner plates together so that when one of the inner plates commences to lean, tilt or otherwise wobble or become unstable, then all of the inner plates will act in unison. This causes a mode of flutter to be set up that is controllable and can be damped by the action of the split outer plates. This damping action occurs due to the centrifugal force on the outer split plates which causes friction to build up due to the drag created by the centrifugal force in urging the outer plate halves radially outwardly.

Thus, the combination of the split outer plates and the flexible or resilient separator S with teeth which engage between the teeth of adjacent inner plates, act to cause the inner plates to be set up in a particular mode of flutter which can then be damped out by the outward sliding action of the outer plate halves. By making the separator of a resilient material and thus compressible, the clutch plates can be axially clamped together without interferring with their clutch-engaging function.

We claim:

1. A friction type clutch having an outer member and an inner hub, interleaved outer plates and inner plates axially slideable on but rotationally fixed on said outer member and hub respectively; said outer plates being of the split type, said inner plates having a series of internal spline teeth for sliding engagement on the complementary splines of said hub, and a resilient separator located between two adjacent teeth of said inner plates to hold all inner plates together and cause them to go into a mode of flutter that can can be damped by said outer split plates, said separator being compressible to permit clamp up of said interleaved plates.

2. A friction type clutch having a radially outer member and a radially inner hub, interleaved outer plates and inner plates axially slideable on but rotationally fixed on said outer member and inner hub, respectively; said outer plates being of the split type, said inner plates having a series of internal spline teeth for sliding engagement on complementary splines of said hub, and an inner plate separator having a series of teeth along two sides thereof and located between two adjacent teeth of said inner plates, said separator being made of the resilient material, whereby said separator acts to hold all inner plates together and causes them to go into a mode of flutter that can be damped by said outer split plates, said separator teeth being compressible to permit clamp up of said interleaved plates.

3. A friction type clutch having an outer member and an inner hub, said outer member having internal splines, said hub having external splines along its length, outer plates having external splines for axially sliding on the inner splines of said outer member, said outer plates being of the split type, inner plates having a series of internal spline teeth for driving and sliding engagement on said hub splines, and an inner plate separator located between two splines on said hub, said separator having a series of teeth along two sides thereof which are located between two adjacent teeth of said inner plates, said separator being made of resilient material, whereby said separator acts to hold all inner plates together and causes them to go into a mode of flutter than can be damped by said outer split plates, said separator teeth being compressible to permit clamp up of said interleaved plates.

* * * * *